(12) United States Patent
Yu et al.

(10) Patent No.: US 9,773,210 B2
(45) Date of Patent: Sep. 26, 2017

(54) SYSTEM AND METHOD FOR PROVIDING INFORMATION

(71) Applicant: Electronics and Telecommunications Research Institute, Daejeon (KR)

(72) Inventors: Jae-Hak Yu, Daejeon (KR); Hyun-Joong Kang, Jinju-si (KR); Mal-Hee Kim, Daejeon (KR); Hyo-Chan Bang, Daejeon (KR); Myung-Nam Bae, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 398 days.

(21) Appl. No.: 14/527,587

(22) Filed: Oct. 29, 2014

(65) Prior Publication Data

US 2015/0134577 A1 May 14, 2015

(30) Foreign Application Priority Data

Nov. 8, 2013 (KR) .................. 10-2013-0135729
Aug. 13, 2014 (KR) .................. 10-2014-0105254

(51) Int. Cl.
   G06F 15/18 (2006.01)
   G06N 99/00 (2010.01)
(52) U.S. Cl.
   CPC .................. *G06N 99/005* (2013.01)
(58) Field of Classification Search
   USPC .......................................... 706/12
   See application file for complete search history.

(56) References Cited

U.S. PATENT DOCUMENTS 8,014,310 B2 * 9/2011 Chang ................ H04L 63/1441
                                                             370/241
8,432,844 B2   4/2013 Bae et al.
(Continued)

FOREIGN PATENT DOCUMENTS

KR  10-2008-0090909 A  10/2008
KR     10-1042600 B1    6/2011
KR  10-2013-0077751 A1  7/2013

OTHER PUBLICATIONS

Scalable Network Traffic Classification Using Distributed Support Vector Machines Do Le Quoc; Valerio D'Alessandro; Byungchul Park; Luigi Romano; Christof Fetzer 2015 IEEE 8th International Conference on Cloud Computing Year: 2015 pp. 1008-1012, DOI: 10.1109/CLOUD.2015.138 IEEE Conference Publications.*

(Continued)

*Primary Examiner* — Michael B Holmes
(74) *Attorney, Agent, or Firm* — Rabin & Berdo, P.C.

(57) ABSTRACT

There is provided a system for providing information. The system includes a data classifying device configured to receive original data and classify the original data as real time data or general data; a real time data analyzing device configured to receive the real time data from the data classifying device and generate condensed information including only a part that satisfies predefined conditions among attribute information of the real time data; and a distributed parallel processing device configured to receive the general data from the data classifying device, perform a predetermined distributed parallel computation process on the general data, and generate analysis information.

8 Claims, 4 Drawing Sheets

(56) References Cited

U.S. PATENT DOCUMENTS

| | | | |
|---|---|---|---|
| 9,230,102 B2* | 1/2016 | Yu | G06F 21/55 |
| 2007/0150458 A1* | 6/2007 | Chung | H04N 21/438 |
| 2010/0067391 A1* | 3/2010 | Chang | H04L 63/20 |
| | | | 370/252 |
| 2011/0208947 A1* | 8/2011 | Lin | G06F 17/30445 |
| | | | 712/28 |
| 2013/0291108 A1* | 10/2013 | Yu | G06F 21/55 |
| | | | 726/23 |
| 2014/0095415 A1* | 4/2014 | Yu | G06N 99/005 |
| | | | 706/12 |
| 2015/0120751 A1* | 4/2015 | Choi | G06F 17/30312 |
| | | | 707/741 |
| 2015/0134577 A1* | 5/2015 | Yu | G06N 99/005 |
| | | | 706/12 |
| 2016/0132754 A1* | 5/2016 | Akhbardeh | G06T 7/20 |
| | | | 382/103 |
| 2016/0277532 A1* | 9/2016 | Lee | H04L 67/322 |

OTHER PUBLICATIONS

Big data environment for geospatial data analysis P. Praveen; Ch. Jayanth Babu; B. Rama 2016 International Conference on Communication and Electronics Systems (ICCES) Year: 2016 pp. 1-6, DOI: 10.1109/CESYS.2016.7889816 IEEE Conference Publications.*

Improved Data Streams Classification with Fast Unsupervised Feature Selection Lulu Wang; Hong Shen 2016 17th International Conference on Parallel and Distributed Computing, Applications and Technologies (PDCAT) Year: 2016 pp. 221-226, DOI: 10.1109/PDCAT.2016.056 IEEE Conference Publications.*

Mark A. Hall, "Correlation-based Feature Selection for Machine Learning", The University of Waikato, Hamilton, NewZealand, Department of Computer Science, Apr. 1999.

* cited by examiner

FIG. 3

FIG. 4

SYSTEM AND METHOD FOR PROVIDING INFORMATION

CROSS-REFERENCE TO RELATED APPLICATION

This application claims priority to and the benefit of Korean Patent Application No. 2013-0135729, filed on Nov. 8, 2013 and 2014-0105254 filed on Aug. 13, 2014, the disclosure of which is incorporated herein by reference in its entirety.

BACKGROUND

1. Field of the Invention

The present invention relates to technology for providing information, and more specifically, to technology for providing information obtained by processing mass object sensing data.

2. Discussion of Related Art

Recently, as Internet or web services move from provider-centered services to user-centered services, personalized services, various services and requirements for users are being actively reflected on. Also, recently, in addition to the Internet or web-based information provided previously, for providing SNSs, UCC, and personalized services, various objects and devices have been linked through the Internet or Web, and communicate and cooperate with each other without a user's intervention, and therefore new services or beneficial information may be generated and provided. Therefore, an amount of data to be processed is also expected to increase exponentially.

In most Internet portals in the pre-built Internet or web environment, techniques in which a large scale cluster is built to process mass data (for example, a video, stream data, and the like) called big data and distributed collection, processing, and managing, distributed parallel processing of mass data are performed are being studied. Generally, a methodology based on a MapReduce model of Google is used. The MapReduce model is a programming model of Google in which a large scale cluster is built at a low cost and distributed parallel computing of stored mass data may be supported.

Basically, MapReduce model-based distributed parallel processing systems for analyzing mass data generated in the Internet or web environment support only offline batch processing and analysis of mass data that is already collected and stored according to a predetermined period. Therefore, in the rapidly changing user-centered Internet or web environment, the MapReduce model-based distributed parallel processing systems have a difficulty in a data processing operation in which a real time search function that may cope with services, requirements, and changes quickly required by users or beneficial analysis information is extracted to use for rapid decision making, marketing, and the like.

SUMMARY OF THE INVENTION

The present invention provides a system and method for providing information that classifies data used in a service or a domain that needs to be quickly processed in real time among object data massively generated in the Internet or web environment, and generates and provides information through a condensation and analysis process of the data.

According to an aspect of the present invention, there is provided a system for providing information. The system includes a data classifying device configured to receive original data and classify the original data as real time data or general data; a real time data analyzing device configured to receive the real time data from the data classifying device and generate condensed information including only a part that satisfies predefined conditions among attribute information of the real time data; and a distributed parallel processing device configured to receive the general data from the data classifying device, perform a predetermined distributed parallel computation process on the general data, and generate analysis information.

The data classifying device may classify the original data as the real time data or the general data based on an optimal hyperplane calculated in advance according to training data.

The real time data analyzing device may classify the real time data as any of one class support vector data description (SVDD) for each service or domain, and the condensed information may be generated such that an attribute subset to which attribute information satisfying predefined conditions belongs among attribute information of the real time data included in the one class SVDD is included.

Each attribute subset to which attribute information satisfying predefined conditions belongs among attribute information of the real time data included in each one class SVDD may be detected, and the condensed information including an attribute subset having the greatest value of a preset merit function among the attribute subset may be generated.

According to another aspect of the present invention, there is provided a method of providing information in which a system for providing information provides information. The method includes receiving, by a data classifying device, original data and classifying the original data as real time data or general data; receiving, by a real time data analyzing device, the real time data from the data classifying device, and generating condensed information including only a part that satisfies predefined conditions among attribute information of the real time data; and receiving, by a distributed parallel processing device, the general data from the data classifying device, performing a predetermined distributed parallel computation process on the general data, and generating analysis information.

The receiving, by a data classifying device, original data and classifying the original data as real time data or general data, may include classifying, by the data classifying device, the original data as the real time data or the general data based on an optimal hyperplane calculated in advance according to training data.

The receiving, by a real time data analyzing device, the real time data from the data classifying device, and generating condensed information including only a part that satisfies predefined conditions among attribute information of the real time data, may include classifying, by the real time data analyzing device, the real time data as any of one class SVDD for each service or domain; and generating, by the real time data analyzing device, the condensed information such that an attribute subset to which attribute information satisfying predefined conditions belongs among attribute information of the real time data included in the one class SVDD is included.

In the generating, by the real time data analyzing device, the condensed information such that an attribute subset to which attribute information satisfying predefined conditions belongs among attribute information of the real time data included in the one class SVDD is included, may include detecting each attribute subset to which attribute information satisfying predefined conditions belongs among attribute information of the real time data included in each one class SVDD, and detecting each attribute subset to which attribute information satisfying predefined conditions belongs among attribute information of the real time data included in each one class SVDD, and generating the condensed information including an attribute subset having the greatest value of a preset merit function among the attribute subset.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

While the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

In description of the invention, when it is determined that detailed descriptions of related well-known technology may unnecessarily obscure the gist of the invention, detailed descriptions thereof will be omitted. The numbers (for example, first, and second) used in description of the specification are used only to distinguish one element from another.

In the specification, it will be understood that when an element is referred to as being "connected" or "coupled" to another element, it can be directly connected or coupled to the other element or intervening elements may be present unless the context clearly indicates otherwise.

Hereinafter, embodiments of the invention will be described in detail with reference to the accompanying drawings. In description of the invention, in order to facilitate overall understanding, like reference numerals are used for like elements even in different drawings.

Figure 1:
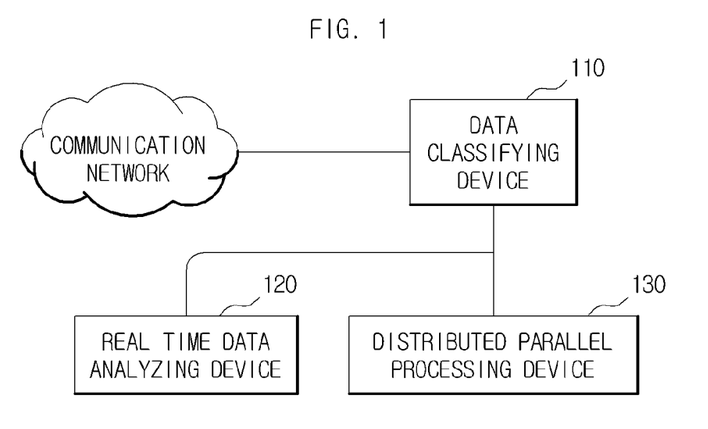
FIG. 1 is a block diagram illustrating an exemplary system for providing information according to an embodiment of the present invention.

FIG. 1 is a block diagram illustrating an exemplary system for providing information according to an embodiment of the present invention.

As illustrated in FIG. 1, a system for providing information according to an embodiment of the present invention includes a data classifying device 110, a real time data analyzing device 120, and a distributed parallel processing device 130. In this case, the data classifying device 110, the real time data analyzing device 120, and the distributed parallel processing device 130, which will be described below, each includes a processor, a memory, a storage medium, and a communication interface and may be implemented such that an instruction for performing a process to be described is stored in the storage medium and the memory and the processor performs an operation according to the instruction. Also, while the data classifying device 110, the real time data analyzing device 120, and the distributed parallel processing device 130 have been described as separate devices, the data classifying device 110, the real time data analyzing device 120, and the distributed parallel processing device 130 may be implemented as a device according to an implementation method.

The data classifying device 110 receives data generated through the Internet or web environment. The data classifying device 110 determines whether each data is data (hereinafter referred to as "real time processing data") used in a service or a domain in which data needs to be processed rapidly in real time or existing mass data (hereinafter referred to as "general data") that does not require real time processing. In this case, the data classifying device 110 may classify data as real time processing data or general data using a binary class support vector machine (SVM). Here, the binary class SVM used in the data classifying device 110 is an exemplary technique, and it should be understood that a classification technique used by the data classifying device 110 is not limited thereto. The data classifying device 110 transmits the real time processing data to the real time data analyzing device 120 and transmits the general data to the distributed parallel processing device 130. An operation process of the data classifying device 110 will be described in detail below with reference to FIG. 2.

The real time data analyzing device 120 classifies the real time processing data as a support vector data description (SVDD)-based one class for each category of the service or the domain. Also, the real time data analyzing device 120 previously removes data having a redundant property or interfering with real time processing among data of each one class and generates condensed information including only optimal attributes for providing real time monitoring and real time analysis information. The real time data analyzing device 120 transmits the condensed information to a terminal.

The distributed parallel processing device 130 generates analysis information by analyzing the general data through known offline batch processing and analysis methods. In this case, the distributed parallel processing device 130 may be a known distributed parallel processing system using a MapReduce model and the like for analyzing mass data, and may generate analysis information of general mass data in general through offline batch processing and analysis according to a predetermined period. The distributed parallel processing device 130 transmits the analysis information to the terminal.

Hereinafter, a process of a system for providing information classifying data generated through the Internet or web environment will be described with reference to FIG. 2.

Figure 2:
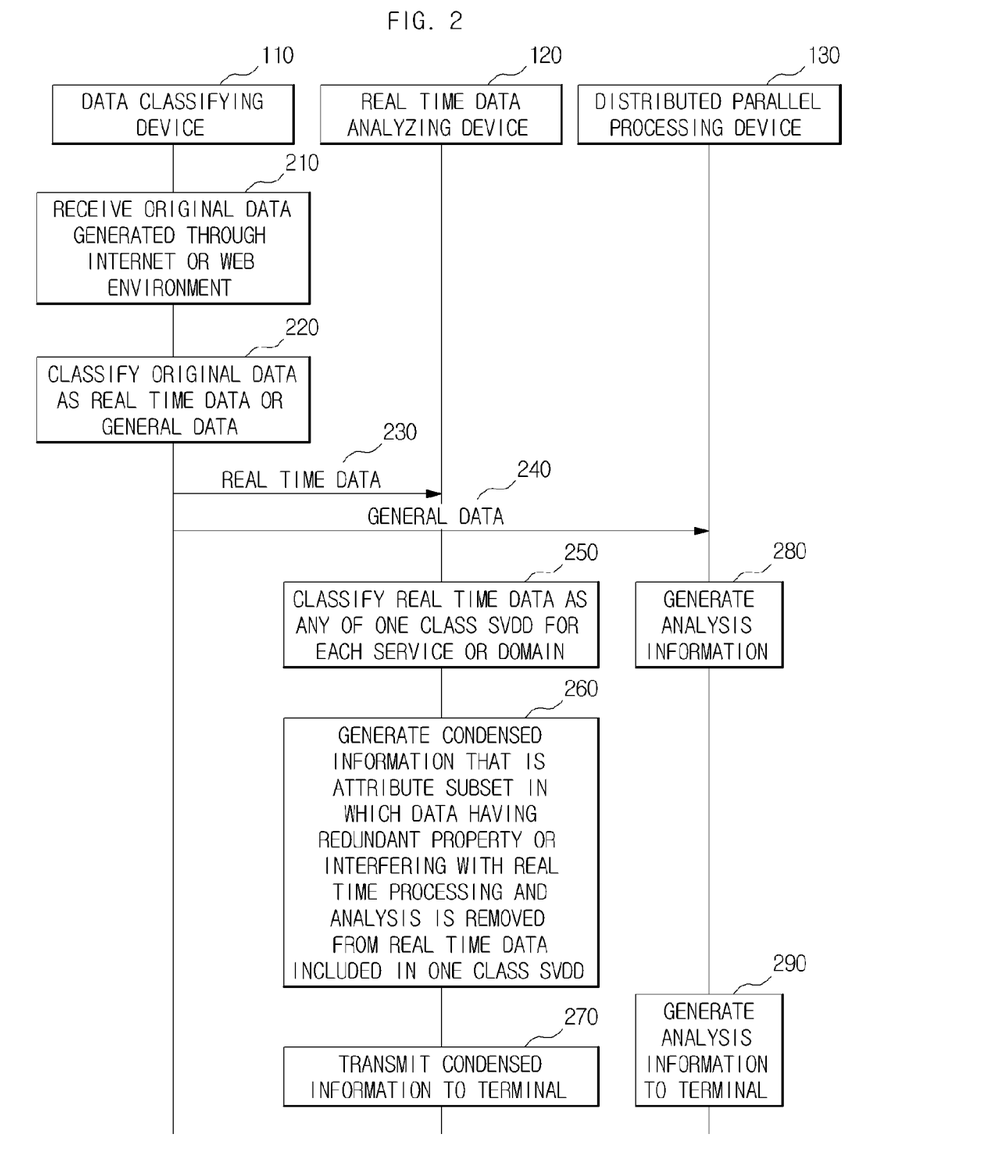
FIG. 2 is a sequence diagram illustrating an exemplary process of classifying data in a data classifying device of a system for providing information according to an embodiment of the present invention.
Figure 3:
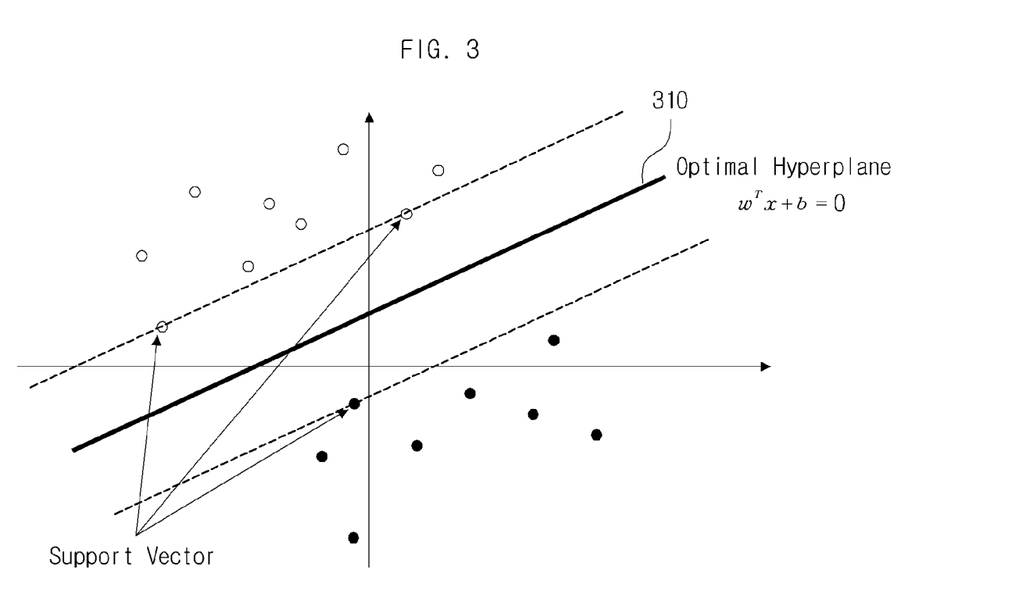
FIG. 3 is a diagram illustrating an exemplary optimal hyperplane used in a data classifying device of a system for providing information according to an embodiment of the present invention.
Figure 4:
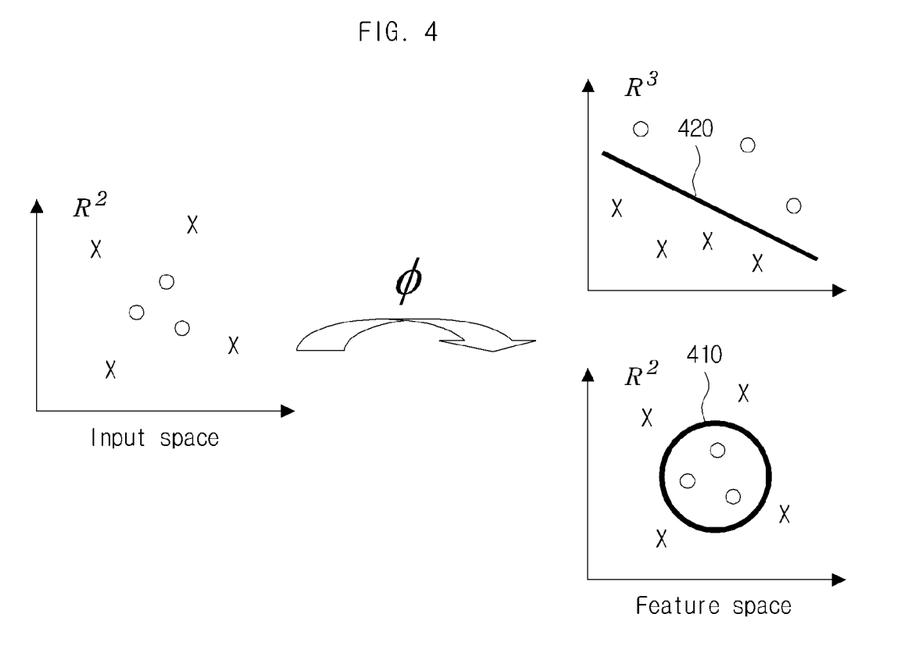
FIG. 4 is a diagram illustrating an exemplary concept of mapping an input space to a high dimensional feature space in a data classifying device of a system for providing information according to an embodiment of the present invention.

FIG. 2 is a sequence diagram illustrating an exemplary process of classifying data in a data classifying device of a system for providing information according to an embodiment of the present invention. FIG. 3 is a diagram illustrating an exemplary optimal hyperplane used in a data classifying device of a system for providing information according to an embodiment of the present invention. FIG. 4 is a diagram illustrating an exemplary concept of mapping an input space to a high dimensional feature space in a data classifying device of a system for providing information according to an embodiment of the present invention.

As illustrated in FIG. 2, in operation 210, the data classifying device 110 receives original data generated through the Internet or web environment.

In operation 220, the data classifying device 110 classifies the original data as real time data or general data. For example, the data classifying device 110 uses a binary class SVM for determining whether the original data is the real time data or the general data. Since the SVM based on a statistical training theory is a binary classifier for minimizing generalization errors using structural risk minimization rather than empirical risk minimization used in a conventional statistical theory, the SVM shows very excellent performance in the field of pattern recognition. Algorithms used in the SVM may be classified as a linear SVM or a nonlinear SVM according to properties of a classification target. A fundamental principle of the SVM used in the data classifying device 110 according to the embodiment of the present invention is based on the linear SVM. When a result value y corresponding to x is present as a binary value {−1, +1} in training data previously input to the SVM, it is represented as a set D in the following [Equation 1]. In this case, the training data is data used for training the SVM, and the data classifying device 110 may perform a training process of defining a hyperplane by receiving training data and an output value corresponding to each training data in advance.

$$D=\{(x^1,y^1), \ldots ,(x^l,y^l)\}, x \in R^n, y \in \{-1,1\} \quad \text{[Equation 1]}$$

In this case, D denotes a set including training data and a result value corresponding to the training data. $x^1$ to $x^l$ (where 1 is a natural number of 2 or more) denote training data. $y^1$ to $y^l$ denote an output value corresponding to each training data. $R^n$ denotes an n-dimensional feature space (in this case, n is a natural number of 1 or more) in which the training data is included.

In this case, in order to define a model for classifying two sets, a hyperplane that is a linear discriminant function as in FIG. 3 may be defined. Each axis of FIG. 3 is an axis corresponding to each component of the training data. For example, when the training data is a value of a 2D feature space, the training data may be represented as two components, and each axis of FIG. 3 may be an axis corresponding to each component of the training data. Hereinafter, a hyperplane in which the shortest distance to the training data is largest among definable hyperplanes is referred to as an optimal hyperplane 310.

When an optimal hyperplane 210 is represented as a classification function ($w^T x+b=0$, where W denotes a normal vector of the optimal hyperplane 210, b denotes a predetermined constant, and x denotes training data) of the training data, a distance r between the optimal hyperplane and the training data has a relation of $$r = \frac{|w^T x + b|}{\|w\|} \geq \frac{1}{\|w\|},$$

and data having a distance r of a lower limit value is placed at a position that is the closest to the optimal hyperplane. Data having a distance r of a lower limit value is referred to as a support vector. Therefore, a distance between two classes (that is, two spaces separated by the optimal hyperplane) separated by the optimal hyperplane becomes a value $$\rho = 2r = \frac{2}{\|w\|}$$

that is two times the distance between the optimal hyperplane and the support vector of each class. In this case, ρ is referred to as a margin of separation.

In this case, in order to compute the optimal hyperplane, the margin of separation needs to be maximized. When the margin of separation is maximized, it may be represented as the following [Equation 2].

$$\text{minimize } \phi(w)=1/2\|w\|^2$$

$$\text{subject to } d_i(w^T x_i+b) \geq 1 \text{ for } i=1, \ldots, N \quad \text{[Equation 2]}$$

In this case, $d_i$ denotes a desired value of i-th training data. For example, when $d_i(w^T x_i+b) \geq 1$ is satisfied, i-th training data may belong to a class +1, and otherwise, the training data may belong to another binary class (for example, −1). N denotes the number of pieces of training data.

In this case, a Lagrange function L may be used to obtain a dual problem of [Equation 2]. The Lagrange function L may be represented as the following Equation 3.

$$L(w, b, \alpha) = \frac{1}{2} w^T w + \sum_{i=1}^{N} \alpha_i [1 - d_i(w^T x_i + b)] \quad \text{[Equation 3]}$$

In this case, $\alpha_i$ denotes a multiplier or an indeterminate coefficient of the Lagrange function and may have a predetermined value.

In order to obtain an optimal solution of [Equation 3], L needs to be minimized with respect to w, b, and L needs to be maximized with respect to α. That is, in order to obtain the optimal solution of [Equation 3], when variables other than w, b in [Equation 3] are fixed, w, b minimizing the L need to be set. Also, in order to obtain the optimal solution of [Equation 3], when variables other than α in [Equation 3] are fixed, α maximizing the L needs to be set.

Since a vector including the optimal solution of the dual problem needs to be a saddle point in an augmented space defined by the Lagrange function, the optimal solution needs to satisfy the following condition [Equation 4].

$$\frac{\partial L}{\partial w} = 0 \Leftrightarrow w - \sum_{i=1}^{N} \alpha_i d_i x_i; w = \sum_{i=1}^{N} \alpha_i d_i x_i, \quad \text{[Equation 4]}$$

$$\frac{\partial L}{\partial b} = 0 \Leftrightarrow \sum_{i=1}^{N} \alpha_i d_i = 0$$

When [Equation 4] is assigned to [Equation 3], an optimization problem of [Equation 4] is defined as a maximization problem of α as in [Equation 5].

$$\max \theta(\alpha) = \sum_{i=1}^{N} \alpha_i - \frac{1}{2} \sum_{i=1}^{N} \sum_{j=1}^{N} \alpha_i \alpha_j d_i d_j \langle x_i, x_j \rangle \quad \text{[Equation 5]}$$

$$= -\frac{1}{2} \alpha^T Q \alpha + \alpha^T \underline{1}$$

$$s.t.\ \alpha_i \geq 0,\ i=1,\cdots,N \text{ and } \sum_{i=1}^{N} \alpha_i d_i = 0$$

When the training data is unable to be classified using the linear SVM, the data classifying device 110 uses the non-linear SVM in which an input data space is mapped to a high dimensional feature space as in FIG. 4. That is, when a 2D input space (a feature space of input training data) is directly applied, a hyperplane separating between training data denoted as "o" and training data denoted as "x" is formed as a circle 410. On the other hand, a hyperplane separating training data denoted as "o" and training data denoted as "x" in a 3-dimensional feature space may be formed as a straight line 420.

In order to efficiently map the training data to a high dimensional feature space, the data classifying device 110 may use a kernel function. When a kernel function $K(x,x_i)$ satisfying Mercer's condition performs a calculation process according to $(\phi(x)\cdot\phi(x_i))$ and is applied to the nonlinear SVM in which a high dimensional inner product is not calculated, it is possible to increase a calculation speed. In this case, the data classifying device 110 may use a polynomial, a radial basis function (RBF), a sigmoid kernel function, and the like as a generally used kernel function.

In the mapped high dimensional feature space, the optimal hyperplane may be represented as "$w^T\phi(x)+b=0$." When a concept of the kernel function is introduced, a problem of training the SVM may be summarized by the following [Equation 6].

$$\max\theta(\alpha) = \sum_{i=1}^{N} \alpha_i - \frac{1}{2}\sum_{i=1}^{N}\sum_{j=1}^{N} \alpha_i \alpha_j d_i d_j K\langle x_i, x_j\rangle \quad \text{[Equation 6]}$$
$$= -\frac{1}{2}\alpha^T Q\alpha + \alpha^T 1$$
$$s.t.\ \alpha_i \geq 0,\ i=1,\cdots,N \text{ and } \sum_{i=1}^{N} \alpha_i d_i = 0$$

In this case, $K\langle xi, xj\rangle$ is a result value according to the kernel function satisfying Mercer's condition.

After training is terminated through the above process, a decision function determining whether input original data is performed with real time processing or offline batch processing may be defined by [Equation 7].

$$f(x) = \text{sgn}\left(\sum_{i=1}^{N} y_i \alpha_i k(x, x_i) + b\right) \quad \text{[Equation 7]}$$

In this case, sgn denotes a sign function.

Therefore, the data classifying device 110 may classify original data as real time data or general data according to Equation 7.

In operation 230, the data classifying device 110 transmits the real time data to the real time data analyzing device 120.

In operation 240, the data classifying device 110 transmits the general data to the distributed parallel processing device 130.

In operation 250, the real time data analyzing device 120 performs a classification process in which each real time data is assigned to any of one class SVDD for each service or domain. In this case, the real time data analyzing device 120 may configure one class SVDD-based multi-class SVM. In this case, when the multi-class SVM does not include one class SVDD corresponding to a service or a domain to which the real time data belongs, the real time data analyzing device 120 may consider that a new domain or service is generated, generate a new one class SVDD corresponding to the service or the domain, and classify the real time data as the corresponding one class SVDD.

In this case, due to a functional limitation of the SVM being a binary predictor and classifier, when a given problem is a multiple decision and classification problem of a mass object sensing data-based service or domain in the present invention, the SVM may not be directly applied. Therefore, in a general research methodology, SVMs as several binary classifiers are organically combined to design a multi-class SVM. However, when SVMs are used to design the multi-class SVM, since each SVM includes a non-observed area and generates a decision boundary, it is highly likely to misclassify new data. Accordingly, it is more advantageous when a decision boundary is selected by one class classifier (one-class SVM) independently representing only one class than when the multi-class SVM is designed. Therefore, the real time data analyzing device 120 according to the embodiment of the present invention designs the multi-class SVM based on the SVDD that is a representative algorithm of the one class SVM and performs automatic classification of a service or a domain using real time mass object sensing data.

For example, when a set of K pieces of training data in a d-dimensional input space is given $$D_k = \{x_i^k \in R^d | i=1,\ldots,N_k\};\ k=1,\ldots K$$
$$D_k = \{x_i^k \in R^d | i=1,\ldots,N_k\};\ k=1,\ldots K$$

(in this case, $D_k$ denote a k-th data set, $x_i^k$ denotes i-th training data of the k-th set, and $N_k$ denotes the number of pieces of training data of the k-th set), a problem of classifying a class corresponding to each set is defined as a problem of obtaining a sphere that includes training data of each class and minimizing a volume thereof, and the problem may be formulated as the following Equation 8.

$$\min L_o(R_k^2, \alpha_k, \xi_k) = R_k^2 + C\sum_{i=1}^{N_k} \xi_i^k \quad \text{[Equation 8]}$$
$$s.t.\ \|x_i^k - \alpha_k\|^2 \leq R_k^2 + \xi_i^k,\ \xi_i^k \geq 0,\ \forall i,$$

Here, $\alpha_k$ denotes a center of a sphere that represents a k-th class, $R_k^2$ denotes a square of a radius of the sphere, $\xi_i^k$ denotes a penalty item that represents a numerical degree of deviating i-th training data included in the k-th class from the sphere, and C is a constant (trade-off constant) for adjusting relative importance.

When the Lagrange function L is applied to obtain a dual problem of [Equation 8], it may be represented as the following Equation 9.

$$L(R_k^2, a_k, \delta_k, \alpha_k, \eta_k) = R_k^2 + C\sum_{i=1}^{N_k} \xi_i^k + \quad \text{[Equation 9]}$$
$$C\sum_{i=1}^{N_k} \alpha_i^k [(x_i^k - a_k)^T(x_i^k - a_k) - R_k^2 - \xi_i^k] - \sum_{i=1}^{N_k} \eta_i^k \xi_i^k$$

-continued $$L(R_k^2, a_k, \delta_k, \alpha_k, \eta_k) = R_k^2 + C\sum_{i=1}^{N_k} \xi_i^k +$$

$$C\sum_{i=1}^{N_k} \alpha_i^k [(x_i^k - a_k)^T (x_i^k - a_k) - R_k^2 - \xi_i^k] - \sum_{i=1}^{N_k} \eta_i^k \xi_i^k$$

where $\alpha_i^k \geq 0, \eta_i^k \geq 0, \forall_i, \alpha_i^k \geq 0, \eta_i^k \geq 0, \forall_i$.

Since [Equation 9] needs to have a minimum value with respect to variables of $R_k^2$, $\alpha_k$, and $\xi_i^k$ needs to have a maximum value with respect to variables $\alpha_k$ and $\eta_k$, the following conditional expression [Equation 10] needs to be satisfied.

$$\frac{\partial L}{\partial R_k^2} = 0 : \sum_{i=1}^{N_k} \alpha_i^k = 1.$$ [Equation 10]

$$\frac{\partial L}{\partial \xi_i^k} = 0 : C - \alpha_i^k - \eta_i^k = 0 \therefore \alpha_i^k \in [0, C], \forall_i.$$

$$\frac{\partial L}{\partial R_k^2} = 0 : \alpha_k = \sum_{i=1}^{N_k} \alpha_i^k x_i^k$$

Therefore, when [Equation 10] is assigned to the Lagrange function L, a dual problem defined by the following [Equation 11] may be obtained.

$$\min \sum_{i=1}^{N_k} \sum_{j=1}^{N_k} \alpha_i^k \alpha_j^k <x_i^k, x_j^k> - \sum_{i=1}^{N_k} \alpha_i^k <x_i^k, x_i^k>$$ [Equation 11]

$$s.t. \sum_{i=1}^{N_k} \alpha_i^k = 1, \alpha_i^k \in [0, C], \forall_i$$

A sphere defined in the input space may represent only an area having a very simple shape. In order to overcome such a limitation, a sphere defined in a high dimensional feature space F defined through a kernel function k may be used. Since each class may more accurately represent its own boundary in each feature space, training of the real time data analyzing device 120 may be performed by obtaining an answer of a convex quadratic problem (QP) defined by the following [Equation 12] in consideration of the independence of a feature space to which each class is mapped.

$$\min \sum_{i=1}^{N_k} \sum_{j=1}^{N_k} \alpha_i^k \alpha_j^k k_k(x_i^k, x_j^k) - \sum_{i=1}^{N_k} \alpha_i^k k_k(x_i^k, x_i^k)$$ [Equation 12]

$$s.t. \sum_{i=1}^{N_k} \alpha_i^k = 1, \alpha_i^k \in [0, C], \forall_i.$$

In this case, when a known Gaussian kernel is used, $k(x,x)=1k(x,x)=1$ is established, and therefore [Equation 12] may be simplified as the following [Equation 13].

$$\min \sum_{i=1}^{N_k} \sum_{j=1}^{N_k} \alpha_i^k \alpha_j^k k_k(x_i^k, x_j^k)$$ [Equation 13]

$$s.t. \sum_{i=1}^{N_k} \alpha_i^k = 1, \alpha_i^k \in [0, C], \forall_i.$$

Therefore, in an application process after training is terminated, a decision function of each class is finally defined as follows.

$$f_k(x) =$$ [Equation 14]

$$R_k^2 - \left[1 - 2\sum_{i=1}^{N_k} \alpha_i^k k_k(x_i^k, x) + \sum_{i=1}^{N_k}\sum_{j=1}^{N_k} \alpha_i^k \alpha_j^k k_k(x_i^k, x_j^k)\right] \geq 0$$

Since an output value $f_k(x)$ of the one class SVM defined in different feature spaces refers to an absolute distance between a boundary of each class of the feature space and the training data, determining a resident class by comparing absolute distances in different feature spaces is not preferable. Therefore, the real time data analyzing device 120 divides the absolute distance $f_k(x)$ in the feature space by a radius $R_k$ of a sphere defined in the feature space to calculate a relative distance $\hat{f}_x(x)=f_k(x)/R_x\hat{f}_x(x)=f_k(x)/R_k$, and may classify a class having the greatest relative distance as a class to which input data x belongs as in the following [Equation 15].

$$\text{Class of } x \equiv \text{argmax}_{k=1,\cdots,k} \hat{f}_k(x)$$ [Equation 15]

$$\equiv \text{argmax}_k$$

$$\left[\left\{R_k^2 - \left(1 - 2\sum_{i=1}^{N_k} \alpha_i^k k_k(x_i^k, x) + \sum_{i=1}^{N_k}\sum_{j=1}^{N_k} \alpha_i^k \alpha_j^k k_k(x_i^k, x_j^k)\right)\right\} / R_k\right]$$

In operation 260, the real time data analyzing device 120 generates condensed information that is an attribute subset in which data having a redundant property or interfering with real time processing and analysis is removed from the real time data included in the one class SVDD. In this case, the real time data analyzing device 120 may perform a process of selecting the attribute subset according to a known method of Hall.

Recently, as Internet services have been moved from a provider-centered service to a user-centered service, service markets using a personalized service and object information have been rapidly increased. In particular, since Internet connections of various objects may generate mass data in real time, management such as real time processing and monitoring has become difficult. Further, in consideration of characteristics for each region, time period, and service, and the like, since types and the number of objects to be used are immeasurably massive, current systems are unable to recognize information in real time in a specific user service. In order to address such problems, the present invention uses optimal attribute subset selection as an essential component for decreasing the dimensions of massive and high dimensional data to guarantee real time processing and improve data processing performance. The optimal attribute subset selection has a problem of finding an attribute subset d in which a feature having a property that is rarely used or redundant is removed in advance from an initial attribute set D, and is provided to maximally guarantee an original property of data while maintaining as little performance degradation as possible. The real time data analyzing device 120 may select an attribute subset through a known method of Hall. In this case, the method of Hall is a method of finding a minimum number of attribute sets that may express a probability distribution of all attributes as accurately as possible using a method of best first search, an entropy of an attribute (or feature) value Y, and by calculating a conditional probability using a Pearson's correlation coefficient between a target class and attributes.

The real time data analyzing device 120 may compute an entropy of any attribute Y in order to obtain an information gain of each attribute included in the training data according to [Equation 16].

$$H(Y) = -\sum_{y \in Y} p(y) \log_2(p(y)).$$ [Equation 16]

A relation between arbitrary attributes X and Y may be represented as [Equation 17] as a conditional probability of Y given X.

$$H(Y \mid X) = -\sum_{x \in X} p(x) \sum_{y \in Y} p(y \mid x) \log_2(p(y \mid x))$$ [Equation 17]

In this case, the information gain of each attribute may be defined as [Equation 18] using [Equation 16] and [Equation 17].

$$\text{Gain} = H(Y) + H(X) - H(X, Y)$$ [Equation 18]

Using symmetrical uncertainty as in [Equation 19] based on the information gain obtained in [Equation 18], the real time data analyzing device 120 may calculate a conditional probability correlation using arbitrary attributes X and Y, and a distribution and Pearson's correlation coefficient between any attribute X and a target class. In this case, the real time data analyzing device 120 adds the attribute X and does not add the attribute Y to a subset that may efficiently express all attributes when Y shows a high distribution and correlation with respect to the attribute X. As described above, the real time data analyzing device 120 calculates a distribution and correlation between each target class and attributes to compose a subset.

$$\text{Symmetrical uncertainty coefficient} = 2.0 \times \left[ \frac{\text{Gain}}{H(Y) + H(X)} \right]$$ [Equation 19]

In this case, in order to evaluate how each subset $F_S \subseteq F$ efficiently expresses all attributes or features, a merit function [Equation 20] may be used. The real time data analyzing device 120 may make a final decision that a subset having the greatest value of the merit function is a subset that may optimally express all attributes.

$$\text{Merit}(F_s) = \frac{k \overline{r_{cf}}}{\sqrt{k + k(k-1) \overline{r_{ff}}}}$$ [Equation 20]

Here, k denotes the number of attributes in a subset $F_S$, $\overline{r_{cf}}$ denotes a contribution of attributes included in $F_S$, and $\overline{r_{ff}}$ denotes an average correlation value of attributes.

In operation 270, the real time data analyzing device 120 transmits the condensed information to a terminal. In this case, the terminal may use the condensed information to provide information that needs to be monitored in real time in a service or a domain, provide real time visibility information for guaranteeing a form and ease of analysis, provide various pieces of analysis information, generate a new service through a mashup function among services or use the condensed information in the domain.

In operation 280, the distributed parallel processing device 130 generates analysis information by analyzing the general data through known offline batch processing and analysis methods. In this case, the distributed parallel processing device 130 may be a known distributed parallel processing system using a MapReduce model and the like for analyzing mass data, and may generate analysis information of general mass data typically through offline batch processing and analysis according to a predetermined period.

In operation 290, the distributed parallel processing device 130 transmits the analysis information to the terminal.

According to an embodiment of the present invention, when mass object sensing data is generated in a service or a domain in which various objects and devices are linked through the Internet or Web and communicate and cooperate with each other without a user's intervention, it is possible to overcome a limitation that real time processing, visibility, and analysis of the data are difficult.

According to an embodiment of the present invention, it is possible to automatically classify, in real time, object sensing data that is massively generated to browse, search for, manage, and control the object for each service or domain in the Internet or web environment.

According to an embodiment of the present invention, by introducing optimal attribute subset selection, it is possible to quickly provide real time monitoring information, a visibility result, and beneficial analysis content to users, service developers, and the like.

According to an embodiment of the present invention, when a new service or domain using mass object sensing data is added, since there is no need to entirely train an automatic classification module again for each service or domain and only a newly added class is trained, incremental update of the module is possible and therefore scalability increases.

A program instruction recorded in recording media may be specially designed and prepared for the invention or may be an available well-known instruction for those skilled in the field of computer software. Examples of the recording media include magnetic media such as a hard disk, a floppy disk, and a magnetic tape, optical media such as a CD-ROM and a DVD, magneto-optical media such as a floptical disk, and a hardware device, such as a ROM, a RAM, and a flash memory, that are specially made to store and perform the program instruction. Examples of the program instruction may include a machine code generated by a compiler and a high-level language code that can be executed in a device for electrically processing information using an interpreter and the like, for example, a computer.

Such a hardware device may be configured as at least one software module in order to perform operations of the invention and vice versa.

While the example embodiments of the present invention and their advantages have been described in detail, it should be understood that various changes, substitutions and alterations may be made herein without departing from the scope of the invention as defined by the following claims.

What is claimed is:

1. A system for providing information, comprising:
a data classifying device configured to receive original data and classify the original data as real time data or general data based on an optimal hyperplane calculated in advance according to training data;
a real time data analyzing device configured to receive the real time data from the data classifying device and generate condensed information including only a part that satisfies predefined conditions among attribute information of the real time data; and
a distributed parallel processing device configured to receive the general data from the data classifying device, perform a predetermined distributed parallel computation process on the general data, and generate analysis information.

2. The system according to claim 1,
wherein the real time data analyzing device classifies the real time data as any of one class support vector data description (SVDD) for each service or domain, and
the condensed information is generated such that an attribute subset to which attribute information satisfying predefined conditions belongs among attribute information of the real time data included in the one class SVDD is included.

3. The system according to claim 2,
wherein each attribute subset to which attribute information satisfying predefined conditions belongs among attribute information of the real time data included in each one class SVDD is detected, and
the condensed information including an attribute subset having the greatest value of a preset merit function among the attribute subset is generated.

4. The system according to claim 2,
wherein, when there is no one class SVDD corresponding to the real time data, the real time data analyzing device newly generates one class SVDD corresponding to the real time data and classifies the real time data as the newly generated one class SVDD.

5. A method of providing information in which a system for providing information provides information, the method comprising:
receiving, by a data classifying device, original data and classifying the original data as real time data or general data based on an optimal hyperplane calculated in advance according to training data;
receiving, by a real time data analyzing device, the real time data from the data classifying device, and generating condensed information including only a part that satisfies predefined conditions among attribute information of the real time data; and
receiving, by a distributed parallel processing device, the general data from the data classifying device, performing a predetermined distributed parallel computation process on the general data, and generating analysis information.

6. The method according to claim 5,
wherein the receiving, by a real time data analyzing device, the real time data from the data classifying device, and generating condensed information including only a part that satisfies predefined conditions among attribute information of the real time data, includes:
classifying, by the real time data analyzing device, the real time data as any of one class support vector data description (SVDD) for each service or domain; and
generating, by the real time data analyzing device, the condensed information such that an attribute subset to which attribute information satisfying predefined conditions belongs among attribute information of the real time data included in the one class SVDD is included.

7. The method according to claim 6,
wherein, in the generating, by the real time data analyzing device, the condensed information such that an attribute subset to which attribute information satisfying predefined conditions belongs among attribute information of the real time data included in the one class SVDD is included, includes
detecting each attribute subset to which attribute information satisfying predefined conditions belongs among attribute information of the real time data included in each one class SVDD, and generating the condensed information including an attribute subset having the greatest value of a preset merit function among the attribute subset.

8. The method according to claim 6,
wherein the classifying, by the real time data analyzing device, the real time data as any of one class SVDD for each service or domain, includes
newly generating one class SVDD corresponding to the real time data when there is no one class SVDD corresponding to the real time data, and classifying the real time data as the newly generated one class SVDD.

* * * * *